April 1, 1952 — R. A. WALLACE — 2,591,389
CHUCK
Filed Jan. 5, 1950 — 2 SHEETS—SHEET 1

INVENTOR.
Richard A. Wallace.
BY
ATTORNEY.

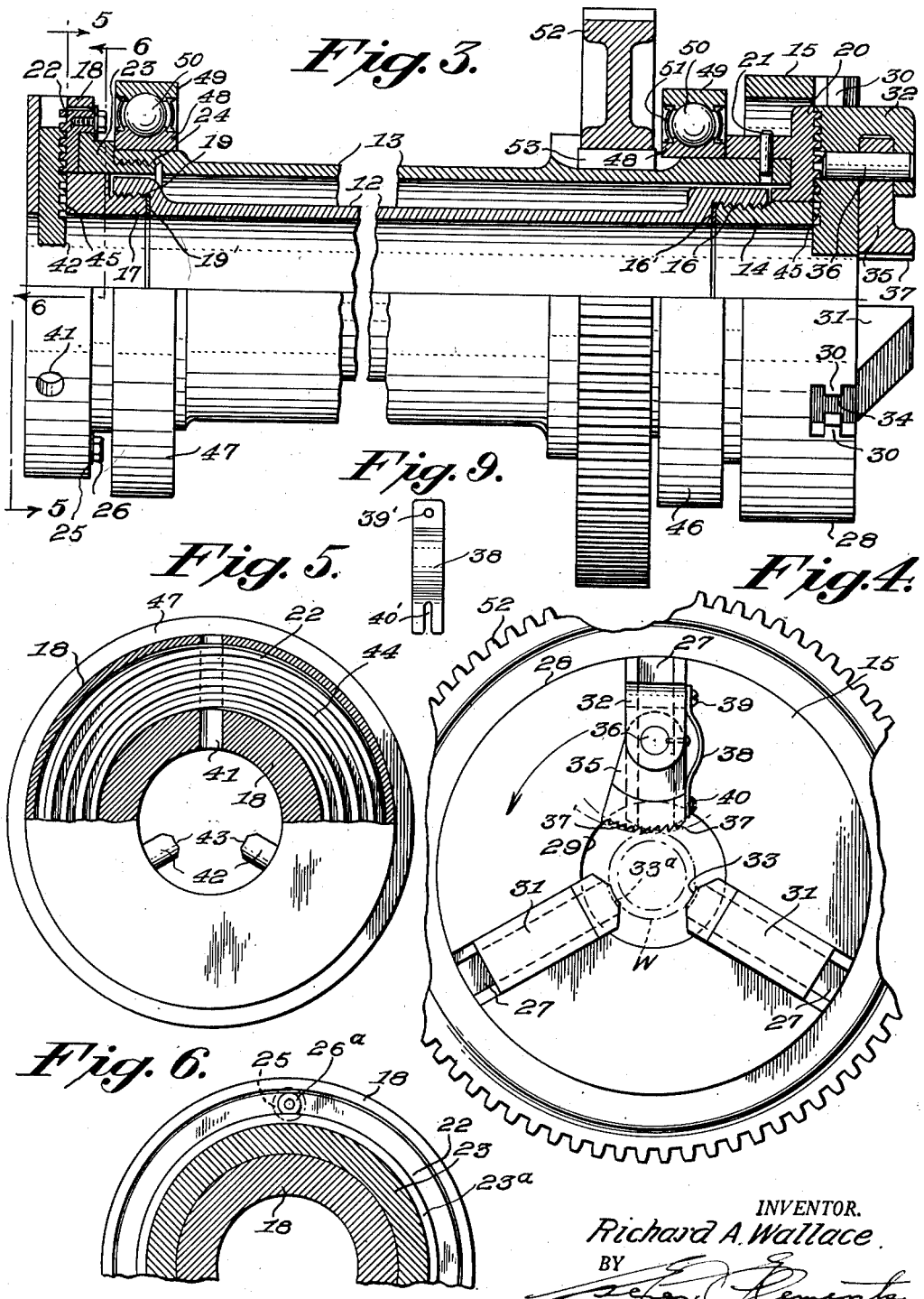

Patented Apr. 1, 1952

2,591,389

UNITED STATES PATENT OFFICE 2,591,389

CHUCK

Richard A. Wallace, Merion, Pa.

Application January 5, 1950, Serial No. 136,918

21 Claims. (Cl. 279—114)

1

This invention relates to a power operated work gripping chuck assembly.

The chuck assembly in accordance with this invention is particularly adapted for use with pipe cutting lathes and threading dies of the general type which are characterized by a motor driven rotatable chuck body having work gripping jaws carried thereby.

A primary object of the invention is to provide an improved double ended chuck assembly embodying a motor driven unit including an elongated cylindrical body member supporting work engaging jaws at each end thereof and which are radially adjustable relative to the body member, and wherein a hand controlled braking means cooperates with the body member for effecting the radial adjustment of the jaws.

A further object of the invention is to provide a motor driven rotatable chuck unit having a plurality of work engaging and centering jaws at one end thereof and a yieldable work engaging and driving jaw at the opposite end thereof.

A still further object of the invention is to provide a work engaging chuck assembly operative to successively engage and disengage the work and which includes a single operation controlling handle operative to effect an otherwise wholly automatic operation of the assembly.

A still further object of the invention is to provide a work gripping chuck assembly which is relatively simple in construction, durable, and which is highly effective and dependable in operation.

Other objects and advantages of the invention will become apparent in the course of the following detailed description, taken in connection with the accompanying drawings, wherein:

Fig. 3 is a fore-shortened view of the chuck per se and wherein same is shown in vertical section above a horizontal diameter thereof and in elevation below such diameter.

Fig. 4 is an end elevation of the front chuck housing with the drive gear therebeyond shown partly broken away.

Fig. 5 is a view partially in vertical section and partially in end elevation of the rear chuck housing, the view being in the planes indicated by the offset line 5—5 on Fig. 3.

2

Fig. 6 is a transverse sectional view in the plane of line 6—6 on Fig. 3.

Figure 2:
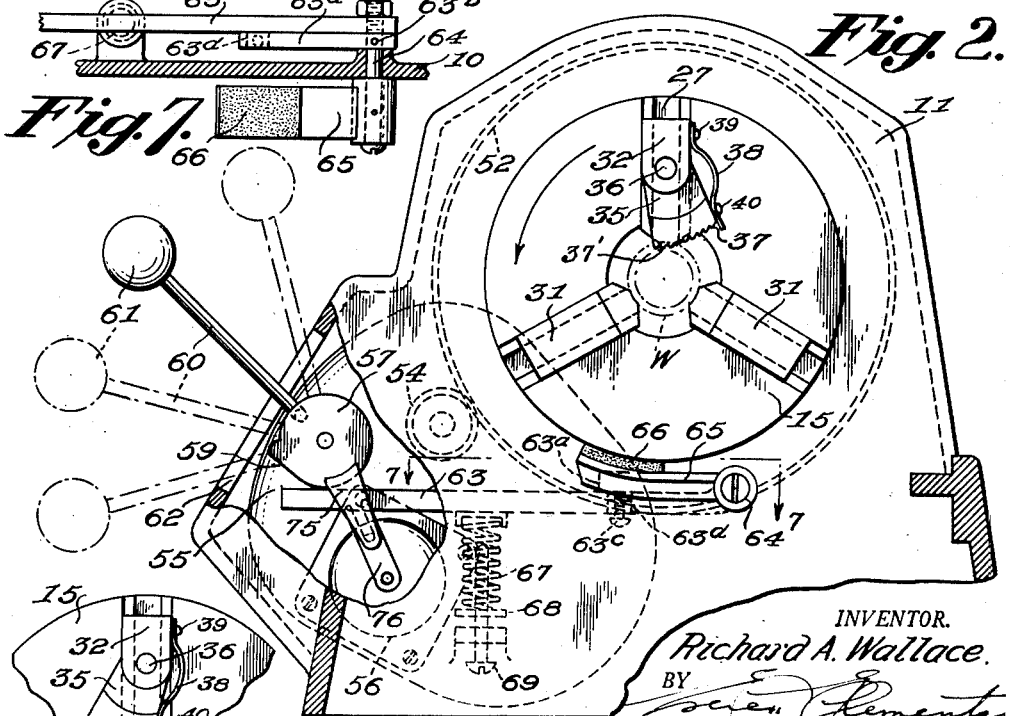
Fig. 2 is a transverse sectional view through the frame and showing the chuck assembly as viewed from the right hand end thereof in Fig. 1.

Fig. 7 is a horizontal sectional view in the plane of line 7—7 on Fig. 2.

Fig. 8 is an elevational view of the drive jaw in one of its operative positions.

Fig. 9 is a face view of a dog engaging spring embodied in the assembly.

Referring now in detail to the drawings, the improved chuck assembly is operatively supported by a frame including a vertical end wall 10 of a housing 11 in which major portions of the chuck assembly are disposed.

The work engaging chuck unit is disclosed in detail in Figs. 3 to 6 and same embodies the following cooperating elements. The unit comprises an inner work enclosing tubular spindle 12 and an outer concentric tubular spindle 13. The inner spindle 12 is rigidly connected at its front end to an inwardly directed flange 14 of a front chuck housing 15 and the connection is preferably a threaded one as is indicated at 16, a shakeproof washer preferably being used as indicated at 16'.

The spindle 12 is also rigidly connected at its rear end to an inwardly directed flange 17 of a rear chuck housing 18 and this connection is also preferably a threaded one as is indicated at 19 preferably with a shakeproof washer 19'.

A scroll plate 20 is rigidly connected to the front end of the outer spindle 13 preferably by means of shear pins 21 and a scroll plate 22 is supported at the rear end of the outer spindle.

For reasons later to appear it is preferable that the scroll plate 22 be rotatably adjustable relative to the spindle 13 and in order to effect such an adjustment plate 23 has a screw threaded connection 24 (preferably with a shakeproof washer) with the rear end of spindle 13 and such plate includes a circumferential flange 23a which is frictionally engaged by edge portions of shakeproof washers 25 releasably retained by bolts 26 which are threaded into two or more bosses 26a on the plate 23 and which overhang the flange 23a.

The front chuck housing 15 is provided with three radially disposed guideways 27 which extend from the outer cylindrical wall 28 of the housing to a central circular opening 29. The guideways are equi-angularly disposed and each includes a pair of opposed guide flanges 30.

A pair of chuck jaws 31 are disposed in two of the three guideways 27 and a chuck master drive jaw 32 is disposed in the remaining guideway 27. The jaws 31 project substantially forwardly of the front face of the housing 15 and are provided with arcuate faces 33 which are concentric with the center of the housing and which faces are provided with teeth 33a to preclude axial slipping of the work.

The jaws 31 as well as the master jaw 32 have base portions disposed in the guideways and such portions are provided with grooves 34 in which the guideway flanges 30 are disposed.

The master jaw 32 projects forwardly of the front face of the housing 15 to substantially the same extent as the jaws 31 but the master jaw includes a dog 35 pivotally supported on a pin 36 and the dog is provided with a series of work gripping teeth 37 which are concentric with the center of the pin 36 and teeth 37' which are eccentric to the center of the pin 36 for a purpose later to appear.

A relatively heavy bowed plate spring 38 has one end thereof rigidly secured to the jaw 32 as by means of a screw 39 engaged in an aperture 39' in such end of the spring. The other end of the spring slidably engages a face on the dog 35 and is maintained in such slidable engagement as by means of a screw 40 threaded into the dog and passing through an open ended slot 40' in said other end of the spring. Thus the said other end of the spring slides on a face of the dog as same pivots about the pin 36 whereby the spring holds the dog in the position of Fig. 8 wherein there is no load on the spring.

The rear chuck housing 18 is provided with three equally spaced and radially disposed bores 41 in which are disposed work engaging and centering chuck jaws 42 which have inner end smooth arcuate work-engaging faces 43.

The scroll plates 20 and 22 are each provided with a spiral tooth or rib as is indicated at 44 in Fig. 5 and such rib engages between teeth 45 on the chuck jaws. The chuck unit is rotatably supported in the housing 11 by means of front and rear bearings 46 and 47 which are disposed adjacent to the respective chuck housings. The bearings include inner raceways 48 supported on the outer spindle 13 and outer raceways 49 which are suitably supported in the frame of housing 11 as is indicated in Fig. 1.

Relatively light ball bearings 50 are disposed in the raceways and preferably oil seal rings 51 are disposed between the raceways and at opposite sides of the ball bearings.

A gear 52 is keyed to the outer spindle 13 as at 53.

Figure 1:
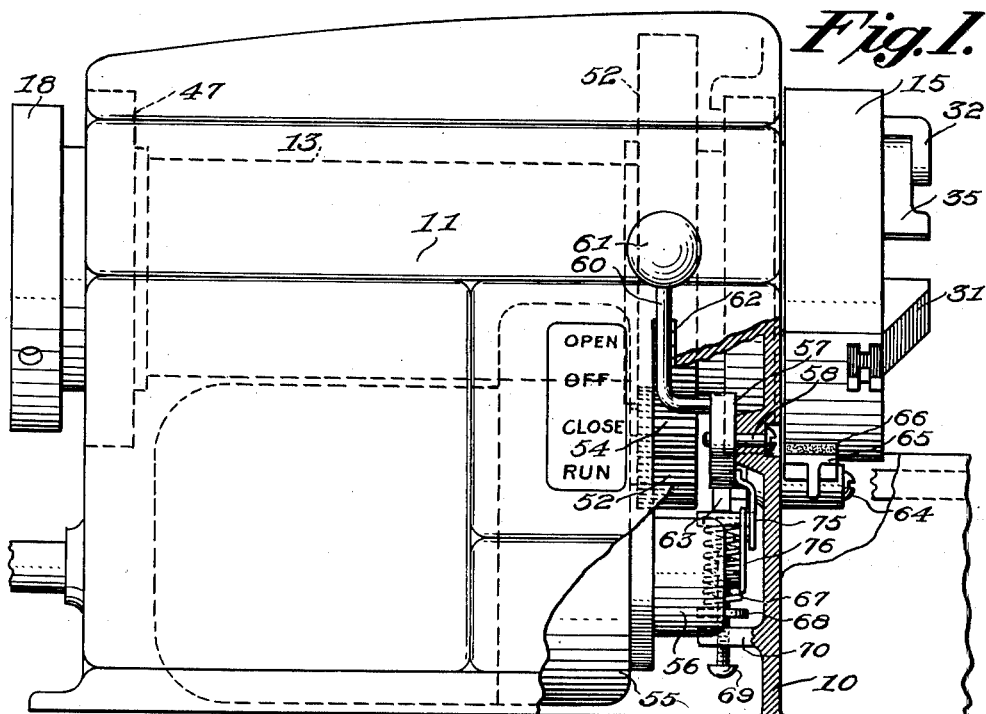
Fig. 1 is a view in side elevation, partially broken away and in section and showing the improved chuck assembly in its operative frame mounted position.

As will be noted from Fig. 1, the rear chuck housing 18 is disposed rearwardly of the rear wall of the housing 11 and the front chuck housing 15 is disposed forwardly of the front end wall 10 of the housing 11.

The chuck unit is rotated by the gear 52, which in turn is rotated by a pinion 54, which projects from and is operated by a suitable motor 55 disposed within the housing 11, and which is provided with a suitable forward-off-reversing switch 56.

The chuck assembly further includes a cam 57 pivotally supported by and within the wall 10 as at 58. The cam includes a major concentric peripheral portion and a minor eccentric peripheral portion 59.

A cam operating handle 60 provided with a knob 61 extends through a slot 62 in a side wall of housing 11 and the inner end of the handle is rigidly connected to the cam.

An elongated link 63 extends within housing 11 and in the plane of cam 57 with one end thereof beneath the cam. The other end of the link is pivotally supported by the wall 10 by means of a bolt 64. The bolt projects externally of the wall and carries a brake shoe 65 which is provided with a lining 66 which is disposed beneath the chuck housing 15 and is adapted to engage the external cylindrical surface 28 thereof between the guideways 27 and the adjacent wall of the housing.

The link 63 is yieldably urged into engagement with the cam 57 by means of a coil spring 67 whose lower end engages a plate 68 on the brake pressure adjustment screw 69 threaded through a lug 70 projecting inwardly from the wall 10. Since it is necessary to adjust the brake shoe 65 relative to the cam 57, the link 63 is loosely engaged with bolt 64 as indicated in Fig. 7. A second relatively short link 63a has one end thereof secured to the bolt as at 63b and an adjusting screw 63c is threadedly engaged in cooperating bosses 63d on the links 63 and 63a.

The handle is movable along the slot 62 to the four positions indicated in Fig. 2 and the side wall of housing 11 is suitably indexed by the words "open," "off," "close" and "run" to indicate corresponding phases of the operation as will be hereinafter more fully set forth.

Having described the structure of the improved chuck assembly, the operation thereof is as follows:

At the outset it is to be understood that the chuck jaws are in a retracted position as has been effected by reversal of the motor as will later appear.

At the start of an operation, the work W, indicated as a piece of pipe, is inserted through the inner spindle 12 as well as the central openings in the front and rear chuck housings 15 and 18.

The operating handle 60 which normally rests in the "off" position, as indicated is now moved to the "close" position which sets the motor 55 into forward motion as by means of an extension 75 on the cam loosely engageable with a motor switch arm 76. While the brake 66 is shown in engagement with the drum surface of the chuck housing 15 with the handle 60 in "off" position, the cam 57 is such that the brake will still be in operative position when the handle is at the "close" position and the motor is running in forward direction.

Thus upon starting of the motor, the front chuck housing 15, the rear chuck housing 18, and the inner spindle 12 will be restrained from rotation while the outer spindle 13 and the scroll plates 20 and 22 will be set into rotation. The rotation of the scroll plates through the interengagement of the spiral teeth thereon with the teeth on the jaws 31, 32 and 42 will move them inwardly into closing position on the outer cylindrical surface of the work W.

When the front chuck jaws 31, 32 are tightly closed upon the work, the brake will begin to slip with the start of rotation of the inner spindle 12. This will impose a load on the motor 55 and the chuck assembly will rotate more slowly than did the spindle 13 and the scroll plates 20 and 22 alone. At this stage in the operation, the handle 60 is moved from the "close" position to the "run" position. In such movement of the handle the high eccentric portion 59 of the cam 57 moves the link 63 downwardly which causes movement of the brake lining 66 away from the front chuck housing 15 whereupon the full power of the motor 55 is available to rotate the work W.

At this point it is to be observed that only the concentric teeth 37 of the dog 35 of the master jaw 32 exerts a driving action on the work W. The jaws 31 which cooperate with the jaw 32 provide a centering and supporting action as well as an axial restraining action.

Furthermore, the rear chuck jaws 42 operate only to center and support the work in axial alinement with the spindles and the purpose of the adjustment plate 23 is that the jaws 42 may be adjusted such as to touch the work W concurrently with the gripping action of the front jaws 31, 32.

The chuck unit rotates in the direction of the arrow in Figs. 2 and 4 wherein it will be seen that the jaw dog 35 opposes the action of the spring 38 and this dog will grip the work tighter as the working torque load upon the work increases.

At this point it is to be noted that the teeth 37 on the master jaw dog 35 which are gripping the work W are concentric to pivot 36 at the side thereof adjacent to the spring 38 and the remaining teeth 37' are on an arc eccentric to the pivot 36.

The dog 35 is indicated in Fig. 8 in its position after gripping the work at which time there is no energy stored in the spring 38. A working torque load applied to the work W in excess of the frictional grip between the jaws 31 and 32 and the work will cause relative rotation between the chuck assembly and the dog 35. Such rotation will cause the dog 35 to rotate further about the pin 36. This relative rotation between the work and the jaws is utilized to automatically bring the dog 35 into increased frictional driving engagement with the work, i. e., as the dog 35 begins to rotate on its supporting pin 36, the teeth 37 gripping the work W being cut on a concentric arc about the pin 36 do not produce a tighter grip upon the work. However, there is a substantial amount of energy being stored in the spring 38. As the dog 35 rotates further on pin 36 the teeth 37' cut on the eccentric arc cause the work to be gripped tighter until the friction force between the dog 35 and the work W is sufficient to stop relative rotation between the dog and work. At this time still greater energy is stored in the spring 38. The position of the dog 35 in this condition is illustrated in Fig. 2. Upon removal of the working torque load from the work W, the energy in the spring 38 will be sufficient to rotate the dog 35 until only the teeth 37 cut on the concentric arc grip the work. This position of the dog 35 is illustrated in Fig. 4. At this time there is still some energy stored in the spring 38 which is essentially the hysteresis loss between the work W and the jaws 31 and 32.

Upon completion of a required operation on the work W, as by threading of a pipe, the jaws are released from their gripping action on the work as follows. The operation handle 60 is moved to the "open" position which through cam 57 and spring 67 causes the brake 66 to again frictionally engage the front housing 15 and through the extension 75 and switch arm 76 the motor is reversed.

The scroll plates 20, 22 will now rotate in reverse direction and effect outward movement of the jaws 31, 32, 42 into their retracted non-work engaging position.

When the jaws are sufficiently clear of the work, the operating handle 60 is moved to "off" position with a resulting stopping of the motor 55 whereupon the work may be readily removed from the chuck assembly and the dog 35 will return to the position illustrated in Fig. 8.

Should it be desired to stop the chuck assembly and not remove the work, the operating handle may be moved from the "run" to the "off" positions which will cause the brake to bear on the front chuck housing 15 and the motor to turn off.

It is to be observed that the driving torque is transmitted from the gear 52, through the key 53 and to the outer spindle 13 and from the outer spindle to the front scroll plate 30 by the plurality of shear pins 21. Since the rear jaws 42 act only to center and steady the work W of the thread connection 24 between the outer spindle 13 and the rear scroll plate 22 through the adjusting plate 23 provides sufficient locking means.

It should be appreciated from the foregoing disclosure that the improved chuck assembly is of relatively simple and durable construction and that same is controlled by a single readily accessible handle upon actuation of which the chuck is otherwise wholly automatic in its work gripping and releasing operations.

While I have disclosed my invention in accordance with a single specific structural embodiment thereof, such is to be considered as illustrative only, and not restrictive, the scope of the invention being defined in the sub-joined claims.

What I claim and desire to secure by U. S. Letters Patent is:

1. A rotatable chuck unit comprising inner and outer concentric tubular spindles, a circular housing connected with each end of the inner spindle, a plurality of jaws slidably disposed by and radially of each housing and each provided with a series of teeth, a scroll plate connected to each end of the outer spindle and provided with a spiral tooth cooperating with the teeth on the respective jaws, and a drive gear connected to the outer spindle intermediate said housings.

2. The structure according to claim 1 wherein the connection of one of said scroll plates to the corresponding end of the outer spindle is effected by means of an adjustment plate in engagement with the scroll plate and connected to the spindle and releasable frictionally engageable means between the adjustment plate and the scroll plate.

3. The structure according to claim 1 wherein one of the jaws carried by one of said housings includes a body portion, a dog having a pivotal connection with the body portion and having a series of work gripping teeth and a spring secured to the body portion and acting against the dog.

4. The structure according to claim 3 wherein the teeth on said dog include a series thereof on an arc concentric to said pivotal connection and a second series in continuation of the first series on an arc eccentric to said pivotal connection.

5. A work gripping power operated chuck assembly, comprising in combination, a frame housing having an end wall and a reversible motor disposed therein and provided with a driving pinion; an outer tubular spindle rotatably supported in the housing with its axis normal to said end wall, a gear secured to said spindle and meshing with said pinion, an inner tubular spindle concentric with said outer spindle, a circular jaw-housing connected to each end of said inner spindle and having a central opening axially of the spindle, a plurality of work gripping and work aligning jaws supported by each circular jaw-housing radially thereof, and friction means for moving said jaws radially in the circular jaw-housings upon relative rotary movement of the spindles.

6. The structure according to claim 5 wherein one of said jaw-housings is provided with flanged guideways for the corresponding jaws, and the other housing is provided with radial bores for the corresponding jaws.

7. The structure according to claim 5 wherein the jaws carried by one of said housings are provided with smooth work engaging surfaces, one of the jaws carried by the other housing having work engaging teeth and the remaining jaws carried by the other housing having work engaging teeth at right angles to the teeth on said one of the jaws.

8. The structure according to claim 5 wherein one of said jaw housings is disposed externally of the frame housing and adjacent said end wall, and a manually controlled brake supported by said wall and engageable with said one of said housings for effecting said relative rotation of the spindles.

9. The structure according to claim 8 wherein said brake comprises an arcuate shoe pivotally supported by said wall, an elongated link connected at one end thereof with said shoe, a spring bearing upwardly on said link for normally engaging the brake shoe with the housing, and said manual control for the brake comprising a disk cam engaging said link in opposition to said spring, and a handle extending through an elongated slot in said frame housing and connected with said cam.

10. The structure according to claim 9 wherein said spring and said cam are disposed adjacent to the opposite end of said link, and adjustable means for varying the tension in said spring, said means comprising a plate engaged with the lower end of said spring and a screw threadedly supporting said plate.

11. The structure according to claim 9 wherein operating means are provided between said handle and said motor operative upon movement of the handle along said slot in predetermined directions and extents to start, reverse and stop the motor.

12. In a power operated work gripping chuck assembly, an inner tubular spindle having a circular jaw housing secured to one end thereof, a plurality of work engaging jaws supported by the housing for adjustment radially thereof, a brake normally engaged with the outer cylindrical wall of the housing and operable to restrain rotation thereof, an outer tubular spindle concentric with the inner spindle, means mounting the outer spindle for rotation, drive means connected to the outer spindle, friction means operatively associated with the outer spindle and said jaws for moving the jaws radially inwardly of the housing upon rotation of the outer spindle when the inner spindle is restrained against rotation by said brake, and manually operable cam means for releasing said brake for simultaneous free rotation of both spindles.

13. The structure according to claim 12 wherein one of said jaws includes a body member, and a spring backed dog having work engaging teeth pivotally connected to the body member, and the others of said jaws having work engaging teeth to prevent movement of the work axially of the spindles.

14. The structure according to claim 12 wherein said friction means comprises teeth on the jaws, and a scroll plate having a spiral tooth engaged with said teeth, said scroll plate being connected to the outer spindle by a plurality of shear pins.

15. The structure according to claim 12 together with a second circular jaw-housing secured to the opposite end of said inner spindle, a plurality of work engaging and centering jaws radially supported by said second housing and friction means operatively associated with the outer spindle and said last jaws for effecting movement thereof radially of the associated housing simultaneously with the radial movement of the first named jaws.

16. The structure according to claim 15 wherein said last named friction means comprises a scroll plate having a spiral tooth, the scroll plate being adjustably secured to an adjustment plate engaged therewith, said spiral tooth cooperating with teeth on the jaws, and said adjustment plate being rigidly secured to the outer spindle.

17. A work gripping power operated chuck assembly comprising in combination, a rotatably mounted outer tubular spindle, a reversible motor having a driving connection with the outer spindle, an inner tubular spindle concentric with the outer spindle, a circular chuck jaw housing rigidly secured to one end of the inner spindle, and having a cylindrical outer brake surface, a plurality of work engaging jaws supported by the housing for movement radially thereof, a pivotally mounted brake shoe normally yieldably engaged with said brake surface for restraining rotation of the inner spindle, cam means associated with the outer spindle and said jaws operative to move the jaws into work engaging position upon rotation of the outer spindle in one direction and when said housing is restrained by said brake, handle operated cam operative to release said brake for simultaneous free rotation of the outer spindle and said housing, a forward, stop and reversing switch on said motor, and a connection from said handle to said switch for movement of said jaws away from said work upon movement of the handle in a different direction, and with the brake engaged with said housing surface while said outer spindle rotates in a reverse direction.

18. A work gripping chuck assembly comprising a tubular spindle for receiving the work, a circular jaw housing rigidly secured to one end of the spindle, a work engaging and driving jaw supported in the housing for movement radially thereof, a plate rotatably supported within said housing, cooperating friction means on the jaw and plate operative to move the jaw radially of the housing upon rotation of the plate relative thereto, and drive means rigidly connected with the plate.

19. In a work gripping power operated chuck assembly, a work receiving tubular spindle, means for rotating the spindle, a jaw supported by the spindle for rotation therewith, a dog having a pivotal connection with said jaw and having work engaging teeth disposed between the axis of said spindle and said pivotal connection, said teeth including a series thereof at said side of said pivotal connection which are concentric thereto, and a second series in continuation of the first series at the opposite side of said pivotal connection which are eccentric thereto.

20. The structure according to claim 19 wherein a spring is connected to said jaw and bears on said dog at one side of said pivotal connection.

21. A work gripping chuck assembly comprising a tubular spindle for receiving the work, a circular jaw housing rigidly secured to one end of the spindle, work engaging and driving jaws supported in the housing for movement radially thereof, a scroll plate rotatably supported adjacent to said housing, cooperating interlocking means between said jaws and scroll plate operative to move the jaws radially with respect to the housing upon rotation of the scroll plate relative thereto and to transmit torque between drive means and work, and having the drive means rigidly connected with the scroll plate.

RICHARD A. WALLACE.

REFERENCES CITED

The following references are of record in the file of this patent:

UNITED STATES PATENTS

| Number | Name | Date |
|---|---|---|
| 1,441,803 | Hay | Jan. 9, 1923 |
| 1,559,033 | Cutler | Oct. 27, 1925 |
| 1,608,463 | Cutler | Nov. 23, 1926 |
| 1,632,018 | Ashton | June 14, 1927 |
| 1,713,799 | Whiton | May 21, 1929 |
| 2,083,944 | Cottrell | June 15, 1937 |
| 2,471,863 | Church | May 31, 1949 |

FOREIGN PATENTS

| Number | Country | Date |
|---|---|---|
| 63,262 | Denmark | Mar. 12, 1945 |